Figure 1:
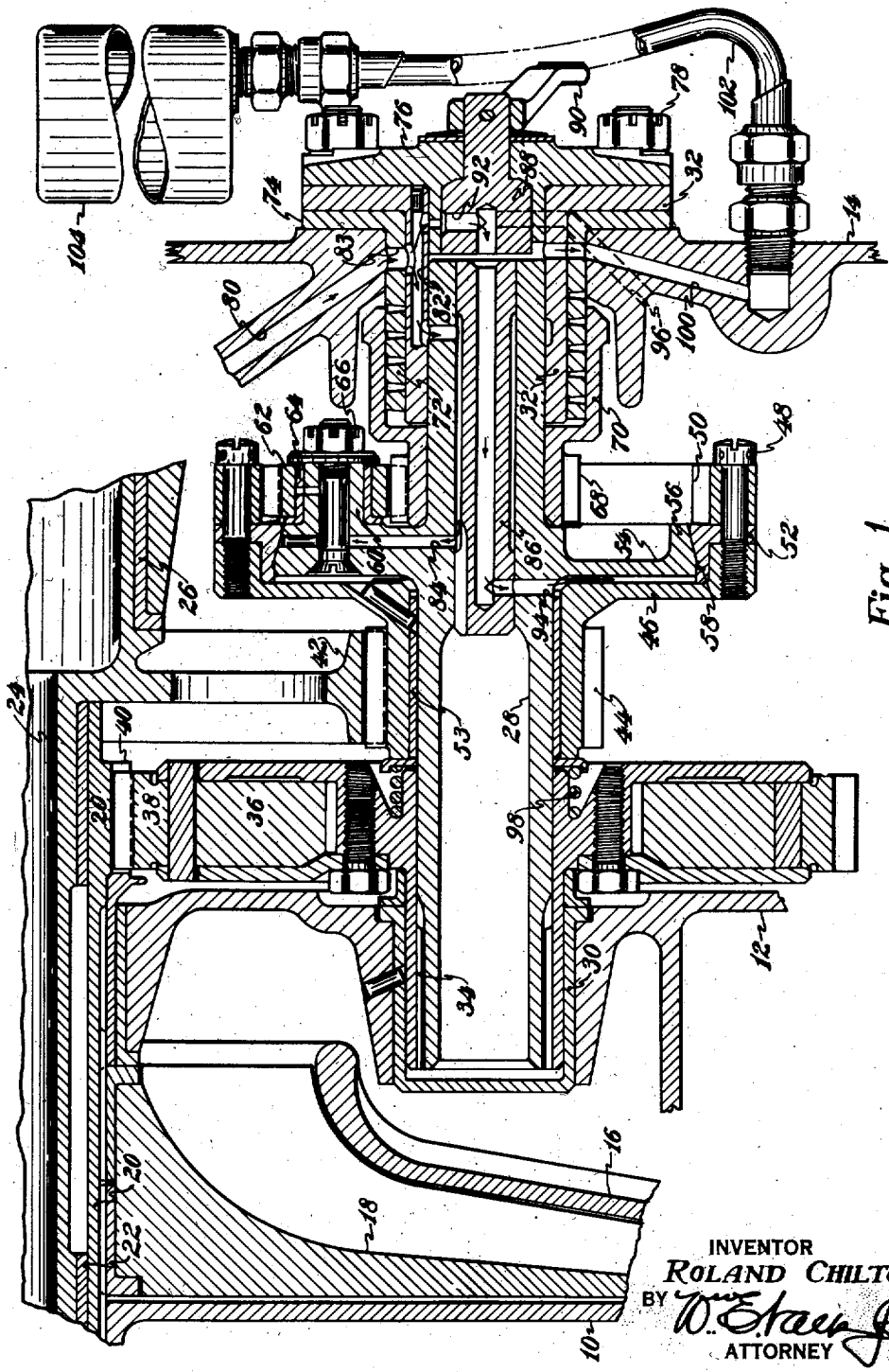

March 17, 1936. R. CHILTON 2,034,087
TWO-SPEED SUPERCHARGER DRIVE
Filed July 14, 1933 2 Sheets-Sheet 1

INVENTOR
ROLAND CHILTON
BY
ATTORNEY

March 17, 1936.　　　　R. CHILTON　　　　2,034,087
TWO-SPEED SUPERCHARGER DRIVE
Filed July 14, 1933　　　2 Sheets-Sheet 2

INVENTOR
ROLAND CHILTON
BY
ATTORNEY

Patented Mar. 17, 1936

2,034,087

UNITED STATES PATENT OFFICE 2,034,087

TWO-SPEED SUPERCHARGER DRIVE

Roland Chilton, Ridgewood, N. J., assignor, by mesne assignments, to The Reed Propeller Co., Inc., Garden City, N. Y., a corporation of New York Application July 14, 1933, Serial No. 680,495

17 Claims. (Cl. 74—290)

This invention relates to speed changing mechanisms and in the specific embodiment of the drawings shows a two-speed centrifugal supercharger drive for use on an aircraft engine.

Such superchargers are used for two purposes: First, to increase the sea level output of the engine by "boosting" the pressure of the intake charge above atmospheric, and second, to maintain sea level induction pressure at altitude in spite of the reduced atmospheric pressure.

It is the practice to provide alternative supercharger drive gears for assembly in a given type of engine, in order to vary the supercharger characteristics according to the service required. When it is desired to develop normal sea level power at relatively high altitude, gears of high ratio are used, but it then becomes necessary to avoid operation of the engine at full throttle at sea level, because excessive manifold pressure and power output, liable to damage the engine, would be developed. Accordingly, the throttle control is equipped with some device to limit operation at low altitudes to reduced throttle opening. This has the objection that, when the manifold pressures are subdued by choking off the air supply in this manner, the horse power absorbed by the supercharger is not reduced in proportion to the reduced pressure output and excessive heating of the intake charge results.

For these reasons, it becomes necessary to provide a high ratio supercharger drive to give optimum supercharging characteristics for high altitude engine operation, and to provide an alternative relatively low ratio supercharger drive to allow optimum full throttle engine operation at low altitudes; the two supercharger drive ratios must be operable by the aircraft crew selectively, and the mechanism must be simple and compact and so constructed that engine operation is not interfered with in changing from one to the other available speed of rotation of the supercharger impeller.

Accordingly, objects of the present invention include the provision of an improved and simplified supercharger driving mechanism which will provide for selective gear ratios; one giving optimum sea level performance and the other the desired degree of altitude performance, whereby the characteristics in either condition are freed from limitations imposed by the other.

A further object is to provide a mechanism of this type which shall be so compact as to permit of incorporation inside conventional supercharger gear housings in place of the usual single speed supercharger gears. An associated object is to provide a two-speed supercharger drive which may be shifted from one ratio to the other at will and one in which very small loads are imposed on the control mechanism.

Generally, the invention is embodied in a radial air cooled aircraft engine provided at its rearward end with a supercharged induction system, the latter being suitably connected to the engine cylinders. The supercharger generally comprises an impeller arranged to be driven by the engine crankshaft through gearing having a ratio whereby the impeller rotates, according to the gearing used, at four to twelve times crankshaft speed. The gear train gearing may include a lay shaft geared to the crankshaft, the impeller in turn being geared to the lay-shaft. The two speed drive of my invention is preferably arranged on the lay-shaft, and comprises a planetary unit having an internal gear fixed to a pinion revoluble on the lay-shaft and driven by the crankshaft. The internal gear meshes with a series of planet gears carried by a disk which is fixed to the lay-shaft. These planet gears in turn mesh with a central sun gear concentric with the lay-shaft, but the sun gear is organized to rotate freely in one direction but to be prevented from opposite rotation by a one way clutch connected with the engine casing.

Means are provided for locking the planet-carrying disk to the internal gear, whereby a direct drive is effected from the crankshaft driven pinion to the lay-shaft. In such a position of adjustment, the planet gears are locked to the internal gear and the sun gear revolves with them about the lay-shaft axis. This is the high ratio drive.

When the planet disk is unlocked from the internal gear, the latter causes the planet gears to rotate about their own axes, and to rotate the planet disk, and hence the lay-shaft, at reduced speed. In this position of adjustment, the sun gear would tend to rotate reversely, but is prevented from so doing by the one-way clutch.

It will thus be seen that the only change-speed control necessary is the locking and unlocking of the planet disk to and from the internal gear, this control comprising a hydraulically operated friction clutch between said two elements.

Figure 2:
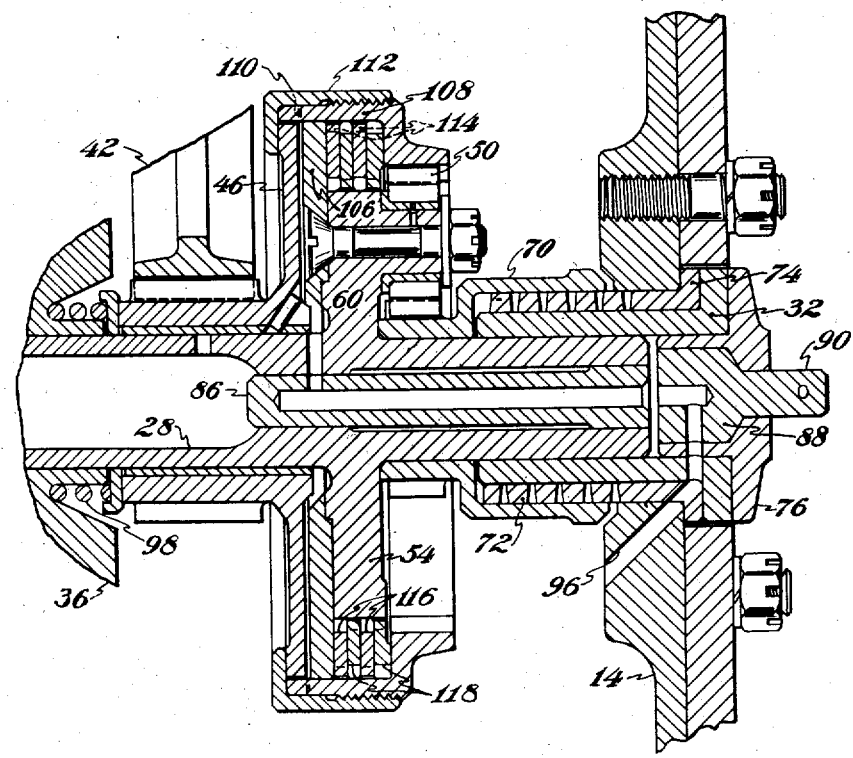

In the drawings, wherein similar numbers indicate similar parts,

Fig. 1 is an axial section through an engine including the mechanism of the invention, and including a fragmentary section through the supercharger to be driven, and Fig. 2 is a detail sectional view showing a modified construction for the clutch.

Referring first to Fig. 1, 10, 12, 14, and 16 show portions of the normal walls of the supercharger housings formed as part of the engine, while 18 designates a conventional supercharger impeller fixed on a hollow shaft 20 rotatably mounted on bushings 22 carried by a central driving shaft 24, which, in turn, is supported in a rear bearing 26 at its right-hand end, and is drivably connected to the engine (not shown) at its left-hand end.

A lay-shaft, indicated in general by the numeral 28 is supported in bushings 30 and 32 fixed in the housings 12 and 14, respectively, and there is splined to this lay-shaft at 34 the hub of a shock absorbing clutch 36 which frictionally drives a ring gear 38 meshed with a supercharger pinion 40 shown as integral with a hollow supercharger shaft 20. This clutch may be of the type disclosed in my Patent Number 1,860,851, and needs no further description for the purposes of this disclosure.

The driving shaft 24 is equipped with a driving gear 42 here shown as integral with the shaft, which gear meshes with a pinion 44 integral with a plate 46, to the rim of which there is secured as by screws 48 an annular gear 50, a clutch cone member 52 being interposed as shown. The elements 44, 46, 48, 50, and 52 just described are free to rotate as a unit upon the lay-shaft 28, being mounted thereon on a bushing 53. Within this annular gear assemblage there is disposed a disk 54 integral with the lay-shaft 28 and having a conical rim 56 engageable with the clutch ring 52, both parts being provided with parallel portions 58 having a piston fit. The disk 54 is further provided with planet pinion journals 60 shown as integral, and these journals carry a plurality of pinions 62 mounted for free rotation on bushings 64 and located axially by bolts 66.

Pinions 62 mesh with the annular gear 50 and with a sun pinion 68 which has a hollow extension 70 engaging the outer diameter of helical coils 72 formed integral with a flange member 74 and surrounding the cylindrical extension of the bushing 32. The coil flange member 74 and the bushing flange 32 are secured rigidly to the housing 14 by a cap 76 and nuts 78. This part of the structure comprises an anchored coil clutch restraining the sun pinion 68 from rearward rotation, but leaving this pinion free for forward rotation at any speed. As the sun gear 68 tends to rotate in one direction, the coils 72 tend to wrap up on the bushing 32 allowing the hollow extension 70 to slip freely thereover. When the sun gear 68 tends to rotate oppositely, the coils 72, by their natural expansion, frictionally engage the extension 30; the coils are unwound slightly, thereby jamming against the hollow extension and preventing rotation of the latter with its integral sun gear 68.

The housing 14 is provided with a duct 80 connected to the pressure lubrication system of the engine, and by suitable drillings 82 and 83 in the bushing 32 and flange member 74, the lubricant is led within the hollow lay-shaft 28 and by suitable holes 84 to the pinion bushing 64. These lubricating passages are separated from the pressure control passages, now to be described, by a sleeve 86 driven into the lay-shaft 28. The cap 76 is provided with a control valve 88 which may be oscillated by a control lever 90 and this valve has suitable passages 92 whereby, in the position shown, oil pressure is admitted from the drillings 82 to the interior of the sleeve 86 and thence through a hole 94 to the space between the plate member 46 and the clutch flange 54 of the lay-shaft 28. It will be seen that these parts comprise a short piston and cylinder combination whereby the cone clutch 52, 56 is engaged when oil pressure is admitted.

Suitable drain passages 96 are provided in the cap 76 and associated parts and the valve 88 may be turned to bring the passage 92 into communication with these passages, thus cutting off oil pressure from the clutch members and throwing the pressure space therebetween into communication with the inside of the housing 14, whereby the oil pressure is relieved and the clutch members are free to disengage under the pressure of a light spring 98 placed between the pinion 44 and the clutch 36 for this purpose.

It will now be clear that when the control valve 88 is moved to apply oil pressure between the clutch member 54 and the member 46, the clutch will be engaged, by hydraulic pressure on the area of the piston element 58, and all the parts mounted on the lay-shaft 28 will be locked together for unitary rotation, including the sun pinion 68 which is free for such forward rotation by the coil clutch 72 as previously described.

On the other hand, when the valve 88 is turned to shut off the oil pressure and open up the actuating cavities to a "dumping" passage 96, the cone clutch 56 will be released and the drive reaction will now fall upon the fixed sun pinion 68, on which a rearward turning tendency will be imposed. Such turning being prevented by the anchored coil 72, the drive will be from the pinion 44 through the annular gear 50 and the planet pinions 62 to the planet pinion journals 60, rigid with the lay-shaft 28. In accordance with the well understood operation of planetary gears, this shaft will now rotate slower than the pinion 44 and the slip clutch 36 and supercharger gear 38, partaking of this reduced speed, will drive the supercharger pinion 40 and the supercharger impeller 18 at proportionately reduced velocity in accordance with the objectives of the invention.

Included in the oil pressure system, is a bypass passage 100 which may be connected by a pipe 102 to a closed air pot 104. The object of this is to prevent sudden pressure rises when the valve 88 is thrown into the high gear position shown. It will be evident that the piston element of the clutch 54 is at all times in communication with the interior of the closed pot 104 so that the pressures in both must be at any instant equal, so that after the valve 88 is first opened, oil will flow into the pot 104, compressing the air therein gradually and thus limiting the rate of pressure rise to insure progressive engagement of the clutch 56.

In Fig. 2, there is shown a modification incorporating a multiple disk clutch in place of the cone type shown in Fig. 1. In this modification there is secured to the member 54, which carries the journals 60, a piston plate 106 slidably fitted in a sleeve 108 integral with the gear 50. This gear is conveniently secured to the back plate 46 by end splines 110 and an annular nut 112, and the sleeve 108 is further provided with internal splines 114 with which are engaged clutch plates 116. The member 54 is provided with external splines on which are engaged intermediate clutch plates 118. It will be clear that the operation of this device is similar to that already described in connection with Fig. 1. Fig. 2 also shows the alternative position of adjustment of the valve 88, wherein the hollow sleeve 86 is thrown open to the drain passage 96, and whereby the clutch may disengage under the influence of the spring 98.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination with an engine having a supercharger impeller gear and a driving gear, of a shaft, a pinion thereon drivably engaging one said gear, a gear rotatable on the shaft and engaging the other said gear, planet pinions carried by the shaft, a ring gear rigid with said rotatably mounted gear and engaging said planets, a sun gear engaging the planets, and means to anchor the sun gear against reverse rotation.

2. The combination with an engine having a supercharger gear and a driving gear, of a shaft, a pair of gears on the shaft respectively engaging said driving gear and said supercharger gear, a planetary gear set through which one said shaft gear may drive the shaft at reduced speed, and clutch means adapted to drive the shaft at unitary speed with the said one shaft gear.

3. A two-speed lay-shaft for drivably connecting a driving gear with a supercharger pinion including in combination, a pinion rotatable upon the lay-shaft and engaging the driving gear, a gear on the lay-shaft engaging the supercharger pinion, means for clutching said lay-shaft pinion to the lay-shaft for unitary rotation and planetary gear means for driving said lay-shaft from the pinion at reduced speed when said clutch means is released.

4. A two-speed gear comprising in combination a lay-shaft, means mounted for rotation on the lay-shaft and adapted to engage a source of power, means on the lay-shaft adapted to drive a means to be driven, a planetary gear adapted to drive said lay-shaft from said first mentioned means at reduced speed and including a sun gear, one-way clutch means adapted to prevent reverse rotation of said sun gear, and a friction clutch engageable to drive the lay-shaft at unitary speed with said first mentioned means.

5. A two-speed drive including a shaft, a disk rigid with the shaft, planet pinions carried by said disk, an assemblage mounted for rotation on the shaft and comprising a ring gear and rigid connecting means embracing said disk to form a piston and cylinder combination therewith, clutch means for drivably engaging said ring gear assemblage with said disk, and control means adapted to admit hydraulic pressure to said piston and cylinder combination to engage said clutch.

6. A two-speed drive comprising in combination a shaft, a disk on the shaft, planet pinions carried on said disk, a drive pinion and ring gear assemblage embracing said disk and forming therewith an hydraulic piston and cylinder, friction clutch gear means adapted to drivably engage said shaft disk with said assemblage on admission of hydraulic pressure to said cylinder, a sun gear engaging said planet pinions and means to prevent backward rotation of said sun gear.

7. A change speed planetary gear comprising a cylinder mounted for axial rotation, a piston in said cylinder mounted for translation and rotation with respect thereto and for rotation therewith, a clutch for effecting rotation of said piston with said cylinder upon translation of said piston with respect to said cylinder, a ring gear carried by said cylinder, planet pinions engaging said ring gear and carried by said piston, a sun gear with which said planet pinions drivably engage, and means for introducing fluid under pressure to said cylinder for effecting the indicated translation of said piston.

8. In a planetary gear set, a drive shaft, a coaxial driven shaft, a cylinder having a ring gear, carried by said drive shaft, a piston slidable in said cylinder having planet pinions engaging said ring gear, said piston being mounted on said driven shaft, clutch elements carried respectively by said cylinder and said piston adapted for engagement for locking said piston for rotation with said cylinder upon translation of said piston within said cylinder, and means for introducing fluid under pressure within said cylinder for selectively effecting the indicated translation.

9. In a planetary gear set, a drive shaft, a coaxial driven shaft, a cylinder having a ring gear, carried by said drive shaft, a piston slidable in said cylinder having planet pinions engaging said ring gear, said piston being mounted on said driven shaft, clutch elements carried respectively by said cylinder and said piston adapted for engagement for locking said piston for rotation with said cylinder upon translation of said piston within said cylinder, means for introducing fluid under pressure within said cylinder for selectively effecting the indicated translation, and a sun gear mounted for unidirectional rotation and engaged by said planet pinions.

10. In combination, in an engine supercharger drive having a drive shaft and a concentric supercharger impeller mounted thereon, a lay shaft, a gear on the drive shaft, a pinion on the lay shaft meshing therewith, a gear on the lay shaft, a pinion on the impeller meshing therewith, and gear means wholly carried on said lay shaft selectively operable to effect a direct drive between said lay shaft pinion and gear or to effect a speed reduction between said lay shaft pinion and gear.

11. A two-speed planetary gear comprising in combination, a cylinder mounted for axial rotation, a gear mounted on and coaxial with said cylinder, a piston slidable within said cylinder and rotatable therewith or with respect thereto and having planet pinions mounted for engagement with said ring gear, a sun gear coaxial with said piston and cylinder and with which said pinions engage, clutch means engageable in response to translation of said piston relative to said cylinder for causing said piston to rotate with said cylinder, and means for selectively introducing fluid under pressure to said cylinder for causing the indicated translation.

12. In combination, in an engine supercharger drive having a drive shaft and a concentric supercharger impeller mounted thereon, a lay shaft, a gear on the drive shaft, a pinion on the lay shaft driven thereby, a gear on the lay shaft, a pinion on the impeller driven by the lay shaft gear, and selectively operable gear means wholly carried by said lay shaft for effecting changes in the drive speed ratio between said lay shaft pinion and said lay shaft gear.

13. In combination, in an engine supercharger drive having a drive shaft and a concentric supercharger impeller mounted thereon, a lay shaft, a gear on the drive shaft, a pinion on the lay shaft driven thereby, a gear on the lay shaft, a pinion on the impeller driven by the lay shaft gear, and selectively operable means wholly carried by said lay shaft for effecting changes in the drive speed ratio between said lay shaft pinion and said lay shaft gear, said last named means comprising a hydraulically operated planetary gear set carried on said lay shaft.

14. In combination, in an engine supercharger drive having a drive shaft and a concentric supercharger impeller mounted for rotation thereon, a two-part lay shaft, one part thereof being geared to said drive shaft and the other part thereof being geared to said impeller, and selectively operable variable speed ratio gears for drivably connecting the two parts of said lay shaft.

15. In combination, in an engine supercharger drive having a drive shaft and an impeller shaft, a lay shaft, a fixed ratio driving connection from said drive shaft to said lay shaft, a fixed ratio driving connection from said lay shaft to said impeller shaft in constant driving relation with said impeller shaft, and shiftable gears, means interposed between said driving connections for effecting speed ratio changes between said drive shaft and said impeller shaft.

16. In an engine, in combination, a multi-speed drive mechanism for an engine supercharger, a hydraulically operated piston device for effecting speed changes in said mechanism, a source of fluid pressure, means for selectively placing said source in communication with said piston device, and a cushioning chamber communicating with said device for cushioning the operation of said piston device upon actuation of said selective means.

17. The combination with an engine having a supercharger drive gear and a supercharger pinion, of a lay shaft having a rotationally free pinion engaged with the drive gear and a gear engaged with the supercharger pinion, a planetary gear set including a sun pinion, between the lay shaft and the rotationally free pinion, means to selectively clutch the lay shaft to the rotationally free pinion, and means operative to hold the sun pinion from rotation.

ROLAND CHILTON.

CERTIFICATE OF CORRECTION.

Patent No. 2,034,087.            March 17, 1936.

ROLAND CHILTON.

It is hereby certified that error appears in the printed specification of the above numbered patent requiring correction as follows: Page 4, second column, line 2, claim 15, for the word and comma "gears," read gear; and that the said Letters Patent should be read with this correction therein that the same may conform to the record of the case in the Patent Office.

Signed and sealed this 19th day of May, A. D. 1936.

Leslie Frazer (Seal)                      Acting Commissioner of Patents.

drive having a drive shaft and a concentric supercharger impeller mounted thereon, a lay shaft, a gear on the drive shaft, a pinion on the lay shaft driven thereby, a gear on the lay shaft, a pinion on the impeller driven by the lay shaft gear, and selectively operable means wholly carried by said lay shaft for effecting changes in the drive speed ratio between said lay shaft pinion and said lay shaft gear, said last named means comprising a hydraulically operated planetary gear set carried on said lay shaft.

14. In combination, in an engine supercharger drive having a drive shaft and a concentric supercharger impeller mounted for rotation thereon, a two-part lay shaft, one part thereof being geared to said drive shaft and the other part thereof being geared to said impeller, and selectively operable variable speed ratio gears for drivably connecting the two parts of said lay shaft.

15. In combination, in an engine supercharger drive having a drive shaft and an impeller shaft, a lay shaft, a fixed ratio driving connection from said drive shaft to said lay shaft, a fixed ratio driving connection from said lay shaft to said impeller shaft in constant driving relation with said impeller shaft, and shiftable gears, means interposed between said driving connections for effecting speed ratio changes between said drive shaft and said impeller shaft.

16. In an engine, in combination, a multi-speed drive mechanism for an engine supercharger, a hydraulically operated piston device for effecting speed changes in said mechanism, a source of fluid pressure, means for selectively placing said source in communication with said piston device, and a cushioning chamber communicating with said device for cushioning the operation of said piston device upon actuation of said selective means.

17. The combination with an engine having a supercharger drive gear and a supercharger pinion, of a lay shaft having a rotationally free pinion engaged with the drive gear and a gear engaged with the supercharger pinion, a planetary gear set including a sun pinion, between the lay shaft and the rotationally free pinion, means to selectively clutch the lay shaft to the rotationally free pinion, and means operative to hold the sun pinion from rotation.

ROLAND CHILTON.

CERTIFICATE OF CORRECTION.

Patent No. 2,034,087. March 17, 1936.

ROLAND CHILTON.

It is hereby certified that error appears in the printed specification of the above numbered patent requiring correction as follows: Page 4, second column, line 2, claim 15, for the word and comma "gears," read gear; and that the said Letters Patent should be read with this correction therein that the same may conform to the record of the case in the Patent Office.

Signed and sealed this 19th day of May, A. D. 1936.

Leslie Frazer (Seal) Acting Commissioner of Patents.